United States Patent
Bidwell et al.

[15] 3,665,447
[45] May 23, 1972

[54] METHOD AND APPARATUS FOR PREVENTING INEBRIATED PERSONS FROM OPERATING VEHICLES

[72] Inventors: Dennis P. Bidwell, 31 North Main St.; Douglas R. Davies, 4 Occum Ridge; John T. Hanley, Jr., 202 South Massachusetts Hall; William K. Hart, 102 Hitchcock Hall; Thomas A. Henderson, 114 French Hall; Thomas W. Lovell, 409 New Hampshire Hall, all of Hanover, N.H. 03755; Lloyd C. Fogg, 2 Strafford Avenue, Durham, N.H. 03824

[22] Filed: Dec. 5, 1969

[21] Appl. No.: 882,626

[52] U.S. Cl. .................................... 340/279, 180/82, 180/99, 351/17, 351/18, 356/72
[51] Int. Cl. ........................................ G08b 21/00
[58] Field of Search ............... 331/40; 340/279, 52, 53, 421; 356/72; 351/17, 18, 36, 1, 30, 31; 180/99, 82; 331/40; 353/13, 14

[56] References Cited

UNITED STATES PATENTS 3,312,508 4/1967 Keller et al. ............... 340/279 UX
2,495,708 1/1950 Draeger et al. ............... 331/40

*Primary Examiner*—John W. Caldwell, Jr.
*Assistant Examiner*—William M. Wannisky
*Attorney*—Kenway, Jenney & Hildreth

[57] ABSTRACT

A method and apparatus for preventing an inebriated person from operating a motor vehicle utilizing the flicker fusion frequency phenomenon to identify the inebriate and automatically prevent him from operating the vehicle. The individual is exposed to a light source which randomly changes between an illumination which appears flashing to the sober individual and an illumination which appears steady. Means are provided to prevent operation of the vehicle until a signal from the individual and a signal representing the light change are received contemporaneously by said means.

8 Claims, 1 Drawing Figure

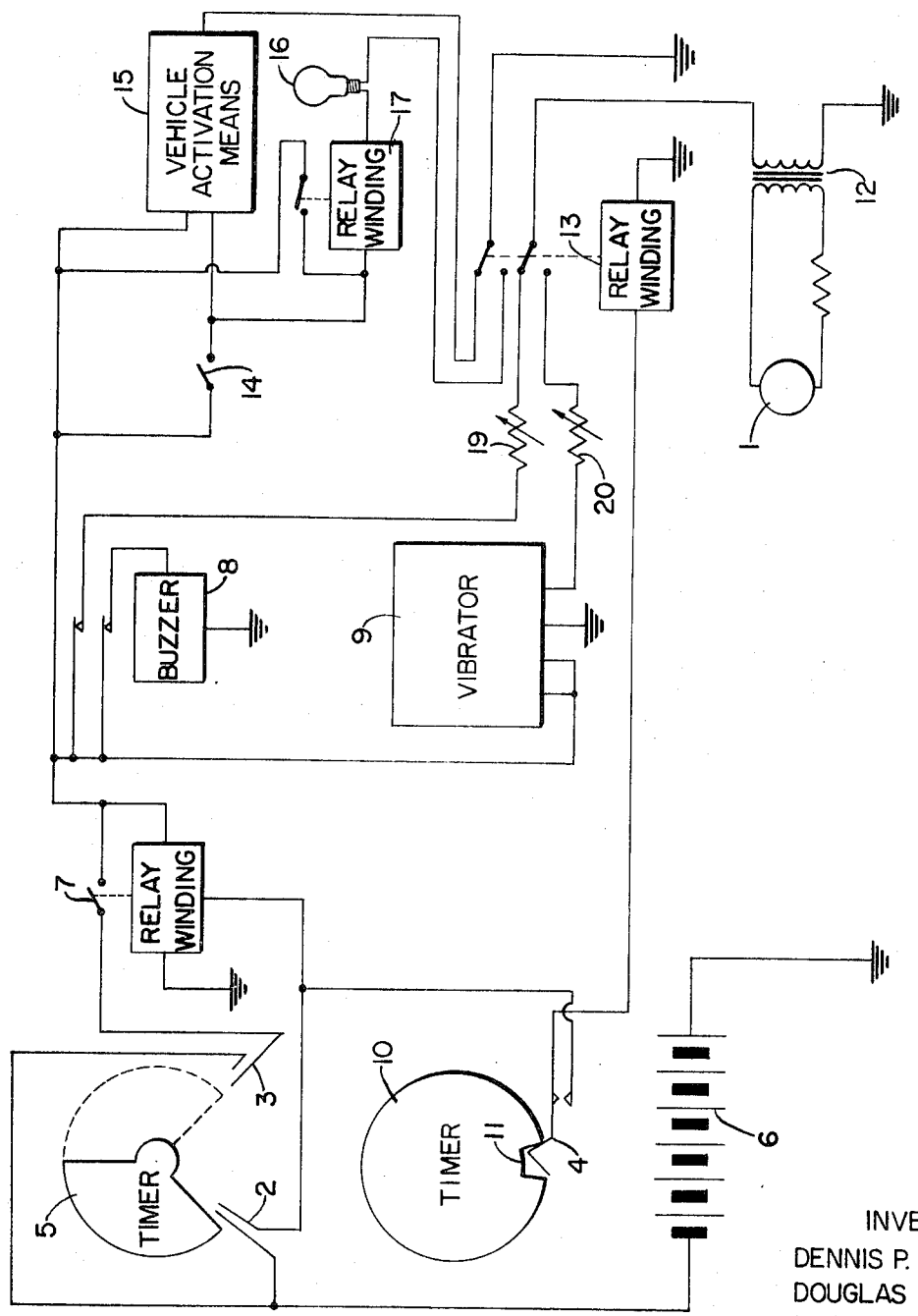

METHOD AND APPARATUS FOR PREVENTING INEBRIATED PERSONS FROM OPERATING VEHICLES

This invention relates to a method and apparatus for preventing inebriated individuals from operating vehicles on the highway.

The number of fatalities due to automotive accidents in 1968 in the United States was about 55,000 and the death rate due to automotive accidents is increasing at an alarming rate. It has been estimated that at least about one half of these fatalities is due directly or indirectly to inebriated drivers who have consumed excessive amounts of alcohol thereby drastically impairing their judgement and reactions making them dangerous to themselves and others when operating a vehicle.

At the present time there is no reliable procedure in force to prevent the inebriated individual from initiating operation of a vehicle. In present practice, an inebriated individual is apprehended only after he has begun operation of the vehicle during which operation he is a menace on the highway and too often is apprehended only after an accident has occurred causing harm or death to himself and/or others.

There are several methods available for detecting the presence of alcohol in the human body including direct chemical means such as breath and blood tests and indirect physiological tests including the measurement of reaction time, dexterity and memory. Each of these tests and/or measurements of alcoholic content in the human body is undesirable for determining whether a human is sufficiently sober to operate a vehicle since they either require direct contact with the body or require an inordinatly long period of time making them impractical. To determine whether an individual should be prevented from operating a vehicle, it is necessary to provide both a quick and accurate test of his sobriety and that, upon failure of the test, provide means making it impossible for the individual either to start his vehicle or proceed onto a highway. It is necessary that the restraint on the driver be automatic upon his failure of the test rather than leaving it to his judgement since it is well-known that judgement is impaired during inebriation. Furthermore it is necessary that the test be sufficiently accurate to provide a quantitative measurement of the alcohol content in the human body since consumption of only minor amounts of alcohol do not impair the driver's reactions and judgement sufficiently to make him dangerous on the highway.

In accordance with the present invention there is provided a method and apparatus for measuring the alcoholic content in the body and when the alcoholic content is in excess of a standard beyond which the person is considered inebriated, he will be prevented automatically from operating the vehicle and/or prevented from proceeding down the highway in the vehicle. The present invention is based upon the "flicker fusion frequency" ($fff$) phenomenon and the effect of alcohol on this phenomenon. When a subject observes a flickering light at a given frequency, he will observe the light to flicker if the frequency is below a certain value and will observe the light to burn steadily if the frequency is above this value. The minimum frequency at which the flickering light appears to fuse is called the "flicker fusion frequency." Individuals who have ingested alcohol have a lower $fff$ than when they are sober and the amount of reduction is directly dependent upon the amount of alcohol ingested.

In accordance with this invention, an apparatus located in or adjacent to a vehicle flashes either a flickering or a steady light observable by the subject. The subject must determine whether the light is steady or flickering. When the subject is correct in his determination he operates a second apparatus which permits a portion of the vehicle vital to its operation to be actuated permitting him to drive the vehicle. Alternatively, the subject after having made the determination may be called upon to actuate an apparatus outside of the vehicle which permits him to proceed through a toll gate onto a highway. When the subject fails the test as evidenced by his failure to actuate the means vital to the operation of the vehicle or toll gate, he must wait a period of time before he can retake the test.

The flicker fusion frequency will vary among subjects and the standard flicker fusion frequency in the apparatus can be established for any general class of individuals or for each subject or group of subjects which may operate the automobile. It has been found that when a class of normal subjects are tested, a variance in $fff$ among the subjects is observed with a small percentage of the normal population having a low fusion frequency and another small proportion having a high value compared to the majority. The distribution will conform to that represented by the familiar bell-shaped distribution curves. However, while the $fff$ will vary among subjects, the variance within the population tested is not as significant as the depression of $fff$ in a subject due to the ingestion of alcohol.

As stated above, the $fff$ reduction will vary directly with the amount of alcohol ingested. For example it has been shown that the flicker fusion frequency in man is decreased by about 10 to 12 percent after ingestion of only about 100 – 150cc of 40 percent alcohol. This is approximately equivalent to the amount of alcohol ingested with two standard mixed alcoholic beverages. This reduction is sufficiently significant to determine whether a subject is inebriated, as for example as defined by the applicable legal definition, or whether he is sober since this difference will generally outweigh the variance in normal $fff$ among subjects. Thus, for example, at a blood alcohol level of 0.67 mg/ml (average maximum), there is a 32.4 percent lowered efficiency of flicker fusion frequency. In contrast with this figure, the base variability of thirty people has been tested to be about 8.8 percent, which shows that the individual differences would be neutralized by the much greater changes affected by alcohol ingestion. As will be discussed below, the $fff$ also varies with light intensity, background illumination, color of the light and other factors. However, the effect of these factors can be determined easily and accounted for in establishing the standard $fff$.

The apparatus of the present invention comprises (a) means for generating a flashing light, (b) means for generating a steady light or a light generated at a frequency greatly in excess of the $fff$, (c) means for changing from one generating means to the other at a random time and (d) means actuated by the operator of the vehicle in response to the visual observation of the change in the type of light observed to permit driving the vehicle he occupies and/or permit entrance onto the highway.

The present invention provides several distinct advantages over present practice for identifying and apprehending inebriated operators of vehicles. This invention permits quick and accurate testing of the subject in or near his automobile without the need for contacting the subject. The test can be conducted by the subject alone without assistance from or under observation of a third party. The test can be conducted prior to the subject's operating the vehicle thereby greatly reducing the possibility of an inebriated subject from driving the vehicle. Also, when the subject has failed the test, he can be penalized by being forced to wait a suitable time before the test can be repeated thereby giving him an opportunity to achieve sobriety.

Any suitable means can be provided to generate steady and flashing light signals. In addition any suitable means can be provided for switching between signals at a randomly selected time to substantially reduce the chances of the subject's passing the test by merely guessing. Any means can be provided to permit the operator to start the vehicle only after successfully passing the test as for example by requiring the operator to open a switch upon his observation of the light change from flashing to steady or visa versa. Once having passed the test, the switch can remain open a suitable time prior to starting the vehicle to permit start up. Thus the switch can be used to activate the ignition system or to operate a valve in the fuel line which permits fuel to pass to the engine. In addition, to reduce the chances of the subject passing the test merely on the basis chance due to a large number of attempts, suitable means can be provided after failure of the test so that a new test is not initiated until after a chosen time as for example about 10 minutes.

The present invention not only includes means which can be associated directly with the automobile's function, but also means can be provided to operate toll stations permitting or preventing access to highways. At a toll station, the apparatus described above can be associated with a bar across the highway which is open only after the subject has been able to successfully distinguish between the steady and flashing light. For example he may be required to operate a switch upon determining the distinction which switch causes the raising of the bar. Suitable means for raising a toll bar are disclosed in U.S. Pat. No. 2,558,434.

As stated above, in determining the standard $fff$, other factors must be taken into account. Since the light color, background light, eye adjustment to existing levels of light and the angle at which the lights subtends the retina can effect the $fff$ they should be taken into account in establishing the standard $fff$ in the apparatus. For example, light intensity affects the $fff$ in accordance with the following equation I:

$$F = a + b \log I$$

wherein $F$ is the flicker fusion frequency, $I$ is the intensity of light, $a$ is the constant (the ordinata at origo) and $b$ is the regression co-efficient (the slope of the above equation). In addition, the relation of the $fff$ to surrounding background light is well known and fully described in "Privy Council, Medical Research Council, Reports of the committee upon the Physiology of Vision, V, The Adaption of the Eye: Its Relation to the Critical Frequency of Flicker" by Lythgoe et al., London, His Majesty's Stationery Office, 1929, pgs., 1–69.

It is preferred that a red light be used to expose the subject since it is difficult to observe in peripheral vision thereby requiring the subject to look directly at the light. In addition the use of red light has the advantage of minimizing the change in $fff$ with respect to effects of adaptation and ambient light. For example where adaptation changes $fff$ with a white light (almost double with dark adaptation and halfed by the end of dark adaptation) it remains almost constant with an increase of 5 percent over 5 minutes during dark adaptation which returns the previous frequency with time when a red light is used. Similarly when red light is employed, the effect of the light intensity of the surroundings is minimized. For example there is only a 12 percent variation of $fff$ for a change in the surrounding illumination from 0.000264 to 7.78 foot-candles, with the highest $fff$ at 0.0237 foot-candles when the light has a wave length of 7,650 millimicrons and at 0.033 foot-candles intensity. The greatest variation that can be expected out of any set of people under any circumstances would be approximately 20 to 25 percent change in the flicker fusion frequency. Accordingly, the present invention would provide virtually 100 percent reliability in determining whether a person has a minimum amount of alcohol in his system.

Reference is made to the attached diagram to provide further understanding of the present invention.

FIG. 1 is a circuit diagram of one embodiment of this invention. The circuit includes a light 1 which can be made to appear flashing or steady. The light 1 is made to flash at the standard $fff$ for sober individuals by means of switches 2, 3 and 4 and timers 5 and 10. The test is initiated by setting timer 5 to close switches 2 and 3. The power from battery 6 then causes relay 7 to close thereby passing power through buzzer 8 and vibrator 9. Buzzer 8 is set to the standard $fff$ desired such as between about 25 and 35 flashes per second and any means can be employed such as a relay with its frequency of oscillation controlled by adjusting the length of its throw. On the other hand, the vibrator 9 oscillates at a frequency much higher than the standard $fff$ so that it causes any light to which it is connected to appear constant even to a sober individual.

Whether the flashing power source from buzzer 8 or the constant power source from vibrator 9 is connected to light 1 is determined by timer 10 and switch 4 by way of relay 13. Timer 10 is set to revolve once every 30 seconds and has a notch the length of which can be set to any convenient equivalent time, for example, 3 seconds. When the notch 11 and switch 4 coincide, the switch 4 is open thereby opening relay 13. This connects the flashing power source from the buzzer 8 to the light 1, which preferably is a neon light, through transformer 12. On the other hand, when the relay 13 is closed, the light 1 will appear constant to the sober viewer. Variable resistors 19 and 20 can be set to control the current passing from battery 6 through either buzzer 8 or vibrator 9 to light 1.

When the observer sees light 1 flashing, he closes switch 14, thereby introducing power into activating means 15 which can be connected electrically to the ignition system or a valve in the fuel system to permit starting the vehicle. Suitable activating means associated with a valve in a fuel system are disclosed in U.S. Pat. Nos. 1,476,166, 1,630,263, and 3,358,481. Suitable activating means associated with an ignition system are disclosed in U.S. Pat. No. 1,542,445.

On the other hand, if the observer closes switch 14 when switch 4 is closed and the light 1 appears steady to the sober individual, power is passed to light 16 through relay 17 and shows the observer he has failed the test in erroneously indicating the light 1 to be flashing when in fact it is steady.

When the observer has failed the test, he cannot reinitiate the test merely by opening switch 14 since relay 17 remains closed until switch 3 is open. Since relay 17 closes to pass power into light 16 rather than activating means 15, the vehicle cannot be started. The switch 3 is open when the timer 5 has revolved once to thereby open relay 17. This permits initiation of a subsequent test as described above. The timer 5 can be set for any desired time, as for example 10 minutes. Similarly, when the individual has passed the test, relay 17 remains open and the power is directed to activating means 15 until the timer has revolved once to open switch 2.

Other alternative means can be employed to obtain the results described above. For example, the flashing light can be obtained with a circuit incorporating a flip-flop-delay and multivibrator circuit connected to a power transistor which is in turn connected to the light. Similarly other means can be employed randomizing the test. Thus, the driver can be made to decide in five times in succession whether a light is steady or flashing before he can start his car. In this embodiment, an intoxicated driver has one chance in 32 of starting his car. Suitable circuits for this test can employ a stepping relay which causes the correct responses and a relay to decide whether the light is flashing or steady, choosing each one with a probability of 0.5.

We claim:

1. The method for testing individuals to prevent an inebriated individual from operating a motor vehicle which comprises exposing the individual to a light source which randomly changes between steady and flashing illumination, said flashing illumination being set at a standard flicker fusion frequency at which the light appears flashing to the sober individual and steady to the inebriate, and providing means for preventing operation of the vehicle until a signal from said individual and a signal representing said light change are received contemporaneously by said means.

2. The method of claim 1 wherein said means for preventing operation of the vehicle is connected to the ignition system of said vehicle.

3. The method of claim 1 wherein said means for preventing operation of the vehicle is connected to the fuel delivery system of the engine in said vehicle.

4. The method of claim 1 wherein the said means is connected to a removable barrier in the path of said vehicle.

5. Apparatus for testing individuals to prevent an inebriate from operating a motor vehicle which comprises means for varying the power frequency to a light so that for a small time period the light changes between steady and flashing illumination, said flashing illumination being set at a standard flicker fusion frequency at which the light appears flashing to the sober individual and steady to the inebriate, means for randomizing the time to effect said light change and means for preventing operation of the vehicle until a signal from said individual and a signal representing said light change are received contemporaneously by said means.

6. The apparatus of claim 5 wherein said means to prevent operation is connected to the ignition system of said vehicle.

7. The apparatus of claim 5 wherein said means to prevent operation is connected to the fuel delivery system to the engine in said vehicle.

8. The apparatus of claim 5 wherein said means is connected to a removable barrier in the path of said vehicle.

* * * * *